US012623537B2

(12) United States Patent 
Iliffe-Moon et al.

(10) Patent No.: US 12,623,537 B2 
(45) Date of Patent: May 12, 2026

(54) USER INTERFACE FOR A VEHICLE, A VEHICLE, AND A METHOD FOR OPERATING A USER INTERFACE FOR A VEHICLE

(71) Applicant: Bayerische Motoren Werke Aktiengesellschaft, Munich (DE)

(72) Inventors: Etienne Iliffe-Moon, Menlo Park, CA (US); Iris Koser, San Carlos, CA (US); Wei Wang, San Francisco, CA (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 25 days.

(21) Appl. No.: 18/569,190

(22) PCT Filed: Jul. 8, 2022

(86) PCT No.: PCT/EP2022/069108 
§ 371 (c)(1), 
(2) Date: Dec. 11, 2023

(87) PCT Pub. No.: WO2023/001593 
PCT Pub. Date: Jan. 26, 2023

(65) Prior Publication Data 
US 2024/0270072 A1 Aug. 15, 2024

(30) Foreign Application Priority Data

Jul. 22, 2021 (EP) ..................................... 21187100

(51) Int. Cl. 
B60K 35/10 (2024.01) 
B60K 35/21 (2024.01) 
B60K 35/22 (2024.01) 
(52) U.S. Cl. 
CPC ............ B60K 35/10 (2024.01); B60K 35/211 (2024.01); B60K 35/22 (2024.01); 
(Continued)

(58) Field of Classification Search 
CPC ...................................................... G06F 3/017 
See application file for complete search history.

(56) References Cited

U.S. PATENT DOCUMENTS

| | | | |
|---|---|---|---|
| 10,310,274 B1 | 6/2019 | Reichow | |
| 2012/0287663 A1* | 11/2012 | Lathrop | ............... B60K 35/415 |
| | | | 362/558 |

(Continued)

FOREIGN PATENT DOCUMENTS

EP 2738582 A2 6/2014

OTHER PUBLICATIONS

International Search Report corresponding to International Patent Application No. PCT/EP2022/069108, dated Sep. 19, 2022 (2 pages).

(Continued)

*Primary Examiner* — Nan-Ying Yang 
(74) *Attorney, Agent, or Firm* — Maginot, Moore & Beck LLP

(57) ABSTRACT

A user interface for a vehicle includes a two-dimensional display and an optical faceplate. The display displays information on a display portion. The optical faceplate includes a contact surface, a three-dimensional display surface for displaying information, and an optic light guide material. The optical faceplate is integrated into the display such the areal extension of the display surface and/or the contact surface is smaller than an areal extension of the display. The contact surface receives light emitted from the display. The user interface further includes comprises a device that determines a context according to a state of the vehicle, information that is visible on the display portion and/or the display surface, and/or user input captured by the user interface. The user interface displays contextually dependent information so that the information that is visible on the (Continued)

display portion and on the display surface depend on the determined context.

20 Claims, 2 Drawing Sheets

(52) U.S. Cl.
   CPC   *B60K 2360/1468* (2024.01); *B60K 2360/167* (2024.01); *B60K 2360/336* (2024.01); *B60K 2360/595* (2024.01)

(56)                     References Cited

U.S. PATENT DOCUMENTS

| | | | |
|---|---|---|---|
| 2013/0179811 A1 | 7/2013 | Nagara et al. | |
| 2016/0378131 A1* | 12/2016 | Battlogg | F16H 59/0217 |
| | | | 74/553 |
| 2017/0371524 A1* | 12/2017 | Fujita | G06F 3/04845 |
| 2018/0373350 A1* | 12/2018 | Rao | G06F 3/0362 |
| 2022/0229500 A1* | 7/2022 | Fong | G06F 3/0362 |

OTHER PUBLICATIONS

Extended European Search Report corresponding to European Patent Application No. EP21187100.9, dated Jan. 5, 2022 (5 pages).

* cited by examiner

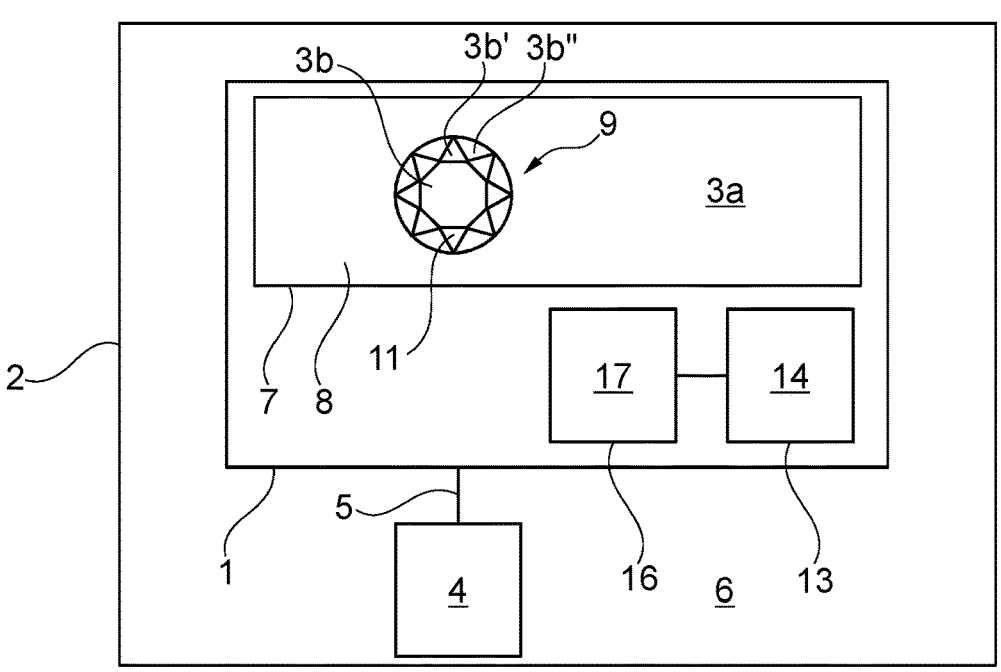
Fig. 1
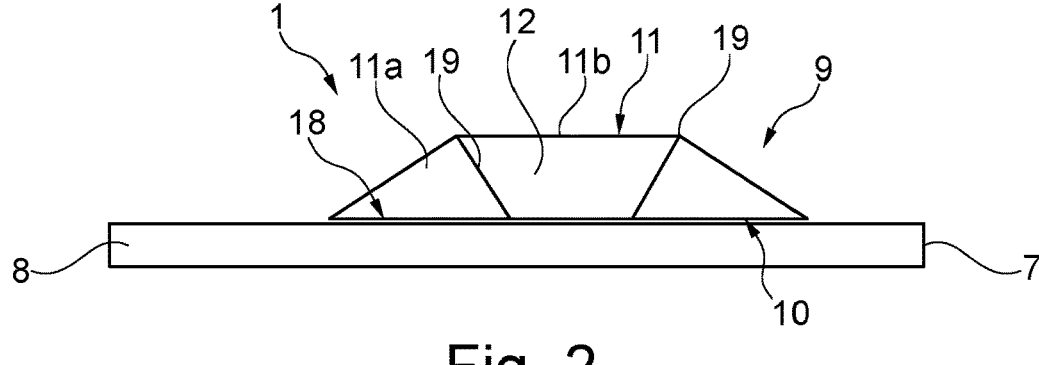
Fig. 2
Fig. 3

USER INTERFACE FOR A VEHICLE, A VEHICLE, AND A METHOD FOR OPERATING A USER INTERFACE FOR A VEHICLE

The present application is the U.S. national phase of PCT Application PCT/EP2022/069108 filed on Jul. 8, 2022, which claims priority of European patent application No. 21187100.9 filed on Jul. 22, 2021, which is incorporated herein by reference in its entirety.

TECHNICAL FIELD

The present disclosure relates to user interfaces for vehicles and methods for operating user interfaces for vehicles.

BACKGROUND

A known user interface can comprise a two-dimensional flat display to display information and/or a physical button or knob to capture user input.

Two-dimensional displays are used to present a variety of information to the driver and/or other passengers of the vehicle. Two-dimensional displays can comprise a touch functionality to capture user input. Thereby, the two-dimensional display with touch functionality, also called touch-screen, can provide a part of the user interface with a large number of functions. During driving it appears to be difficult to make use of the large number of functions, in particular for the driver who needs to pay attention to driving the vehicle. Furthermore, due to a lack of feedback perceivable by a user, e.g., the driver, in case of a touch sensitive display it appears difficult for the user to perform an accurate input, e.g. with a user's finger. For the same reason, the driver is distracted and needs to pay visual and cognitive attention to operate a touch sensitive display. That is, such a two-dimensional display comprises a plurality of aspects that needs to be improved.

Physical buttons provide a physical affordance which provides important benefits, in particular when used in a vehicle. E.g., user-friendliness by providing physical stability to a finger interacting with the button, reduced distraction as opposed to using a touchscreen, and familiarity as the button's physical location and function is substantial and consistent. The physical button allows a blind operation since the user memorizes and/or feels where to find the button, how to operate it and/or which function it has. In addition, a physical button may also be an aesthetic feature of the vehicle. A physical button or knob can also present information, e.g., a rotatable knob can present information about a volume of a radio by its orientation or a slide control can present information about a temperature set for an interior of the vehicle. However, physical buttons have properties that may be disadvantageous, such as having a dedicated function and a lack of relationship to the digital user interface, e.g., to content that is displayed on a two-dimensional display.

US 2014/0147087 A1 discloses a display comprising an image device configured to output an image; and a faceplate configured to propagate the image to a display surface of the faceplate. The display is expected to be more aesthetically pleasing than a flat display. However, the two-dimensional display is fully covered by the faceplate. As a result, the user might not distinguish easily between different pieces of information that are visible at the display surface, since any information is presented in an equal manner on the display surface. Certain types of digital content or media to be displayed at the display surface may not be adapted to be displayed at the display surface of the faceplate, e.g., movies, photos, animations, music album cover artwork, etc. Covering the entire display with a faceplate might not be cost-effective, especially as the two-dimensional display gets larger. Furthermore, the interaction with the user interface could be difficult as the user, in particular the driver, cannot easily determine where to perform input at the display surface.

There is a need, therefore, for further improved functionality and user-friendliness of a user interface.

SUMMARY

The above-stated need, as well as others, are addressed by at least some embodiments disclosed herein.

At least one embodiment is a user interface for a vehicle adapted to present visible information and adapted to capture user input comprises a two-dimensional display for displaying information on a display portion, and an optical faceplate comprising a contact surface, a three-dimensional display surface for displaying information, and an optic light guide material provided between the contact surface and the three-dimensional display surface. In other words, the faceplate comprises the contact surface, the three-dimensional display surface and the optic light guide material.

According to one embodiment, the faceplate is integrated into the display so that an areal extension of the three-dimensional display surface and/or an areal extension of the contact surface is smaller than an areal extension of the display, and so that the contact surface is arranged to receive light emitted from the display. The faceplate is integrated into the display, i.e., the faceplate is mounted to the display, wherein the faceplate covers a partial or smaller fraction of the area of the display. The display portion is the part of the two-dimensional display which remains visibly perceivable by a user to deliver information that is two-dimensionally presented by the two-dimensional display. In contrast, the two-dimensional display comprises a contact portion that contacts the contact surface of the faceplate to transmit light that is emitted by the contact portion of the two-dimensional display via the contact surface and the light guide material to the three-dimensional display surface, i.e., the contact portion of two-dimensional display transmits information to be presented by the three-dimensional display surface to the faceplate by emitting light that is receivable by the contact surface, and the contact portion is covered by the faceplate. The integration of the faceplate in the display enables to build a direct relationship between the faceplate and the display portion of the two-dimensional display.

According to some embodiments, the user interface comprises a context determination device adapted to determine a context according to a state of the vehicle, the information that is visible on the display portion, the information that is visible on the three-dimensional display surface, and/or user input captured by the user interface. Therein, the state of the vehicle can be understood as any piece of information that characterizes the vehicle in a broad sense, e.g., it can comprise inter alia information whether the vehicle is driving or not, a geographical position of the vehicle, a current time, a temperature in an interior of the vehicle, the number, identities, and/or seating positions of passengers of the vehicle. The state of the vehicle can also comprise information about systems or devices that are connectable and/or connected to the vehicle, e.g., directly, wired or wireless, or indirectly via an external server, i.e., a cloud, such as smart devices, smartphones, wearables or apps running on a smart device, in particular for being used with the vehicle. These states of the vehicle contribute to the context of the user and/or the vehicle. This may be important for example to enable navigation or entertainment in autonomous vehicles and/or electric vehicles.

The information that is visible on the display portion and the information that is visible on the three-dimensional display surface form information that is provided by the user interface and that is visually perceivable by the user. The user is the driver of the vehicle, a passenger of the vehicle or can mean a plurality thereof. The state of the vehicle, the information that is visible on the display portion, the information that is visible on the three-dimensional display surface, and/or the user input captured by the user interface are used to determine the context which reflects the situation of inter alia the vehicle, the user and/or an intended and/or recommended use of the user interface. The determination of the context is the basis for the user interface being intelligent and contextual so that the graphical content of the information that is delivered from the user interface to the user can vary, adopt and/or respond according to the state of the vehicle, the information that is visible on the display portion, the information that is visible on the three-dimensional display surface, and/or the user input.

According to one or more embodiments, the user interface is adapted to display contextually dependent information so that the information that is visible on the display portion and the information that is visible on the three-dimensional display surface depend on the determined context. This connects the information that is visible on the display portion and the information that is visible on the three-dimensional display surface with the determined context. In contrast to prior art, according to which for example a button that is pressed is illuminated as a visible piece of information in reaction of pressing the button without a relevance of a context, the user interface according to the invention does not only display such a direct piece of information in reaction of a simple user input but instead determines a context first and, based thereon, provides a contextually dependent output on the two-dimensional display and on the faceplate.

Before the output of the information that is visible on the display portion and the information that is visible on the three-dimensional display surface is determined, the context is determined as the basis for the aforementioned information. Since the state of the vehicle, the information that is displayed on the display portion, the information that is displayed on the three-dimensional display surface, and/or the user input are used to determine the context, and the context of has an implication for the determination of the information that is displayed on the display portion and of the information that is displayed on the three-dimensional display surface, the determination of said displayed information contributes to improved user-friendliness and functionality of the user interface as any potentially relevant information to determine the output of information can be considered. Thereby, the faceplate becomes a contextual three-dimensional user interface object. The benefit is a combined digital-physical affordance that is context-sensitive by intelligently adapting to the determined context. Thereby, user distraction is minimized and the use of the user interface and of its available options are optimized to improve the ease of use, i.e., the user-friendliness of the user interface. Different interaction zones dependent on the GUI structure and/or content can be created.

Optionally, the user interface is adapted to separately determine the information that is visible on the display portion and the information that is visible on the three-dimensional display surface to enable the user interface to deliver information via the two-dimensional display and information via the faceplate which is potentially separate from each other. In this embodiment, the user interface can separately determine the content that is displayed by the two-dimensional display and by the faceplate. The content that is displayed by the two-dimensional display and the faceplate may be different from each other, however, depending on the context that is determined, e.g., the user interface can present information about a temperature in an interior of the vehicle by the display portion of the two-dimensional display and information about a personal digital assistant by the faceplate. However, even though the information that is visible on the display portion and the information that is visible on the three-dimensional display surface are separately determined, it is possible that the information that is visible on the display portion and the information that is visible on the three-dimensional display surface are contextually related to each other.

Optionally, the user interface is adapted to display contextually dependent information so that the information that is visible on the display portion and the information that is visible on the three-dimensional display surface relate to each other to provide a contextual dependence between the information displayed on the two-dimensional display and the information displayed by the faceplate. E.g., an icon representing a radio functionality of the vehicle can be depicted on the three-dimensional display surface and detailed information relating to the radio functionality can be displayed on the display portion.

Optionally, the user interface is adapted to, depending on the determined context, move information that is visible on the display portion to the three-dimensional display surface and/or to move the information that is visible on the three-dimensional display surface to the display portion to provide a user-friendly output of content by the user interface. For example, a portion of the three-dimensional display surface can display an icon that represents a radio functionality of the vehicle and the two-dimensional display portion displays detailed information about the radio, e.g., about the volume, a song that is played, etc. If, for example, a phone of a user rings within the vehicle, the context determination device determines that, in this situation, it is relevant that the phone rings.

As a result, the icon that represents the radio functionality can be replaced by an icon that represents a phone and/or a phone functionality of the vehicle and the icon that represents the radio functionality moves to the display portion. Optionally, the user may be able to customize what information is shown where, e.g., by dragging and dropping content from display to the faceplate or vice versa. This may or may not be dependent on the determined context. For example, an incoming phone/video call appears on the display, communication features/shortcuts appear on the faceplate, therein an aspect of the communications function could be dragged to the faceplate and added to the GUI on the faceplate, e.g., adding the person calling to become a Favorite contact, etc.

Optionally, the user interface is adapted to, depending on the user input, move information that is visible on the display portion to the three-dimensional display surface and/or to move the information that is visible on the three-dimensional display surface to the display portion to provide a convenient and effectively combined user interface with different two-dimensional and three-dimensional display zones and optionally interaction zones. For example, the three-dimensional display surface comprises two portions, wherein one portion displays an icon that represents the radio functionality and another portion displays an icon that represents the phone functionality. By a user input, it could be determined whether detailed information concerning the radio functionality for the phone functionality is presented by the display portion of the two-dimensional display and, triggered by user input, the icon for the phone functionality can be moved to the display portion for further user input. Other examples could refer to streaming music services and/or services that comprise a visual content, imagery, animated and/or movie content.

Optionally, the user interface comprises a memory to store past data relating to a context that was determined in the past, a past state of the vehicle, a past information that was visible on the display portion, a past information that was visible on the three-dimensional display surface, and/or past user input captured by the user interface; wherein the context determination device is adapted to receive said past data and to determine the context based on said past data two enable the user interface to present content that may be influenced by past user behavior so that the user interface may reflect a recommendation or shortcut to historically or frequently used functions and/or to improve the dependence of the output of the user interface on the user input and/or on the context.

Optionally, the three-dimensional display surface comprises at least two surface portions that are separated from each other by an edge; wherein the user interface is adapted to display contextually dependent information so that the information that is visible on the at least two surface portions depend on the determined context and/or to separately determine the information that is visible on the at least two surface portions to further improve the user-friendliness and the functionality of the user interface. In this embodiment, the information that is visible on the three-dimensional display surface is, for the user, particularly effectively distinguishable from the information that is visible on the display portion. This embodiment enables a differentiation between information that is visible on different surface portions of the three-dimensional display surface and thereby improves the amount of distinguishable information that is displayed on the three-dimensional display surface. That the three-dimensional display surface comprises at least two surface portions can imply that the three-dimensional display surface, and therefore the faceplate, has a faceted shape, wherein each facet, i.e., each optionally plane surface portion delimited by an edge, can deliver individual and contextually dependent information to the user. An edge is a boundary of a surface portion that is optionally perceivable by a finger of a user.

Optionally, the faceplate is touch sensitive; wherein the three-dimensional display surface comprises at least two surface portions that are separated from each other by an edge; and wherein the user interface is adapted to determine separate information to be displayed on each of the at least two surface portions to enhance the possibility of user input and interaction with the user interface. Therein, the three-dimensional display surface is segmented in at least two surface portions that serve as a touch sensitive element each and therefore as a physical affordance. This improves the user-friendliness of interacting with the user interface.

Optionally, the user interface is adapted to display the information that is visible on the three-dimensional display surface so that light emitted from the display is projected onto the three-dimensional display surface and/or manipulated according to the three-dimensional display surface to provide modes of displaying information on the three-dimensional display surface. In this embodiment, digital content can be mapped to the three-dimensional display surface or facets of the faceplate so that the digital content appears on the surface of the faceplate as optionally three-dimensionally presented information. Alternatively or additionally, e.g. for different surface portion, digital content may be manipulated, e.g. corrected and/or distorted, to appear flat and/or to compensate for the three-dimensional surface of the faceplate. In this embodiment the faceplate appears as a window into the digital content displayed by the two-dimensional display. By correcting and/or compensating for the shape of the three-dimensional surface of the faceplate, the content presented on the three-dimensional surface can appear as flat and/or integrated into the display portion of the two-dimensional display.

Optionally, the display portion and the three-dimensional display surface form a combined user interface to provide an integrated user interface and to improve the integration of the faceplate and the contextual dependence of the information that is displayed by the display portion and of the information that is displayed by the three-dimensional display. In this embodiment, the graphical user interface can exist on the two-dimensional display and on the 3D faceplate. This enables dynamic and transition and/or graphical effects between the two zones, i.e., between the display portion and the three-dimensional display surface. Optionally, content can dynamically move between the two-dimensional display and the three-dimensional faceplate with visual, graphical and multisensory effects, depending on the user interface and/or on the context.

Optionally, the two-dimensional display is touch sensitive, the faceplate is touch sensitive and the user interface is adapted to capture a gesture relative to the faceplate as user input to provide a plurality of input modes. The faceplate can help to provide a well defined field or place of recognition for mid-air gestures. The combination of the faceplate and the display provides a so-called tangible user interface (TUI) that combines interaction of the user with the three-dimensional faceplate and an approach to user experience and interaction, content and design, such that a touch-based user experience that is three-dimensional, intelligent and contextual is improved.

Optionally, the light guide material of the faceplate comprises fiber optics elements having an axis each; wherein the fiber optics elements are arranged so that each of the axes of the fiber optics elements enclose an angle of less than 90°, preferably less than 80°, with the three-dimensional display surface, and/or each of the fiber optics elements is curved between the contact surface and the three-dimensional display surface. In this embodiment, it is possible to provide a distinguished direction, i.e., a direction that is locally not perpendicular to three-dimensional display surface and along which the transmission of light is optimal. The faceplate can most efficiently transmit information to a user looking at the faceplate from a direction that coincides with the distinguished direction, i.e., that coincides with the optical axis of an optical fiber at the three-dimensional display surface. This embodiment enables to control the viewing angle of the faceplate which provides benefits, such as an improvement of the visibility of the digital content projected through the faceplate and displayed on the three-dimensional display surface, compensation for the configuration and/or positioning of the faceplate relative to the user, and/or providing a privacy feature. This embodiment avoids the tendency of a reduction of the visual appearance and quality of the presented information and of visual artifacts and aberrations when the faceplate is viewed off-axis. The context determination device can be adapted to consider information about the arrangement of fiber optics elements of the faceplate to consider preferred view angles of a user when determining a context and/or when the information that is visible at the three-dimensional display surface and the information that is visible on the display portion is determined.

Optionally, the light guide material of the faceplate comprises portions with differently oriented fiber optics elements. This embodiment is particularly effective to present information that is displayed on the three-dimensional display surface in dependence of the viewing angle. Different zones on the faceplate are created that are optimized for different viewing angles and/or different user positions. This is achieved by controlling the orientation of the optical fibers across the different sections of the faceplate. E.g. a first portion of the faceplate comprises fiber optics elements that are oriented in a first direction and a second portion of the faceplate comprises fiber optics elements that are oriented in a second direction different than the first direction to enable a user looking from the first direction to perceive information that is displayed on the first portion of the three-dimensional display surface and to enable a potentially different user looking from the second direction to perceive information that is displayed on the second portion of three-dimensional display surface. The context determination device can be adapted to consider information about the arrangement of differently oriented fiber optics elements of the faceplate to consider preferred view angles of a user when determining a context and/or when the information that is visible at the three-dimensional display surface and the information that is visible on the display portion is determined. This enables the user interface to display visible information that depends on the context, wherein the context comprises information about the identity and/or information about the position of a user.

According to one or more embodiments, the vehicle comprises the user interface as disclosed herein, and can be a car, a motorcycle, bicycle, and/or an autonomously driving vehicle.

According to some embodiments, a method for operating a user interface for a vehicle adapted to present visible information and adapted to capture user input comprises: displaying information on a display portion of a two-dimensional display; displaying information on a three-dimensional display surface of an optical faceplate via a contact surface arranged to receive light emitted from the display and an optic light guide material provided between the contact surface and the three-dimensional display surface; wherein the faceplate is integrated into the display so that an areal extension of the three-dimensional display surface and/or an areal extension of the contact surface is smaller than an areal extension of the display; determining a context according to a state of the vehicle, the information that is visible on the display portion, the information that is visible on the three-dimensional display surface, and/or user input captured by the user interface; and displaying contextually dependent information so that the information that is visible on the display portion and the information that is visible on the three-dimensional display surface depend on the determined context. The method for operating the user interface comprises the same advantages and those optional features as described with reference to the user interface as described above.

Further features are given in the claims, in the figures, and in the description of the figures. Features and combinations of features as describes above and features and combinations of features as disclosed in the figures and described with relation to the figures can be used as such or combined without leaving the scope of the disclosure.

BRIEF DESCRIPTION OF THE DRAWINGS

FIG. 1 shows a schematic representation of a user interface of a vehicle according to an embodiment;

FIG. 2 shows a section of a schematic side view of the user interface shown in FIG. 1;

FIG. 3 shows a schematic of a method to operate the user interface as shown in FIGS. 1 and 2;

DETAILED DESCRIPTION

Figures 4, 5:
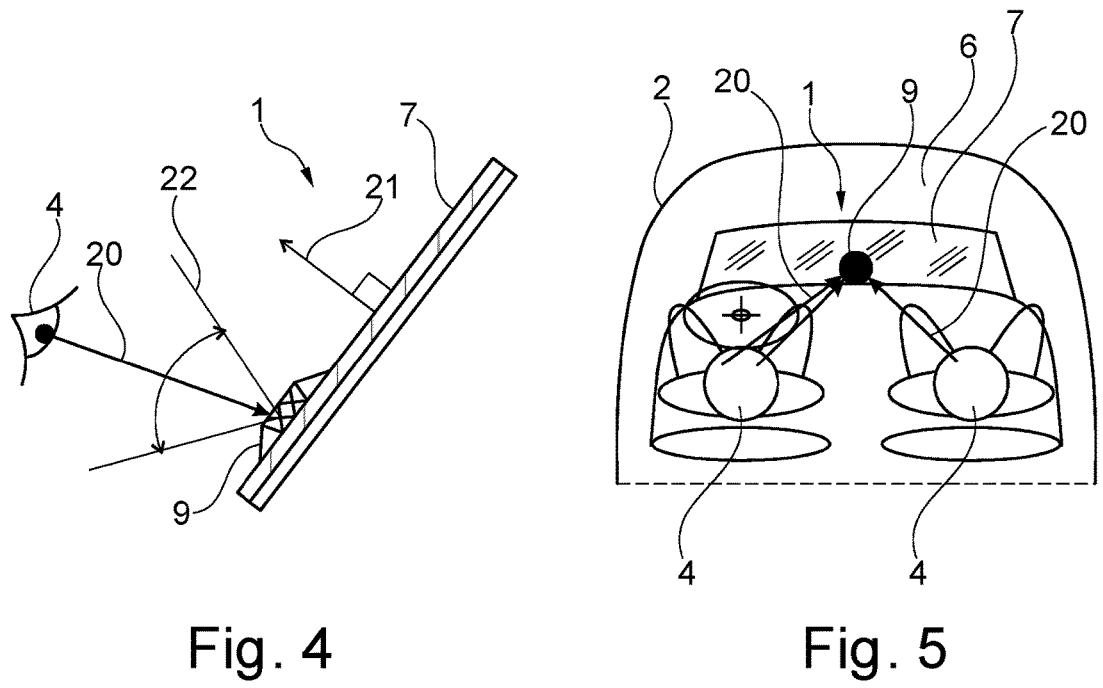
FIG. 4 shows a schematic representation of the user interface and a user looking at the user interface of FIGS. 1 and 2.
FIG. 5 shows a schematic representation of two users in a vehicle looking at the user interface of FIGS. 1, 2, and 4.

In the figures, elements of identical function are denoted in each case with the same reference signs.

FIG. 1 shows a schematic representation of a user interface 1 comprised by a vehicle 2. The user interface 1 is adapted to present visible information 3*a*, 3*b*, 3*b'*, 3*b''* to a user 4 and adapted to capture user input 5 by a user 4. The user 4 can be a driver of the vehicle 2 and/or a passenger of the vehicle 2. The user 4 can also be a passenger of an autonomously driving vehicle 2.

The user interface 1 is arranged in a cabin 6 of the vehicle 2 so that the user 4 can perceive visible information 3*a*, 3*b*, 3*b'*, 3*b''* output by the user interface 1.

The user interface 1 comprises a two-dimensional display 7, also called display panel, for displaying information 3*a* on a display portion 8. The display portion 8 is a section of the two-dimensional display 7 on which information 3*a* is displayed in a two-dimensional and visibly perceivable manner. However, information 3*a* that is displayed can also be rendered to appear three-dimensional, e.g., the display 7 may be a display that simulates 3D, e.g., a stereographic or autostereographic display. The two-dimensional display 7 comprises a pixel structure, e.g., a pixel matrix with a two-dimensional array of colored pixels that can be illuminated individually. The two-dimensional display 7 does not necessarily refer to a geometric shape of the display, e.g., the display, optionally including a pixel structure of the display 7, may be curved and/or bent. The two-dimensional display 7 can be curved or bent about one or more axes, optionally to have a shape that follows a section of the cabin 6 of the vehicle 2.

The user interface 1 comprises an optical faceplate 9 comprising a contact surface 10, a three-dimensional display surface 11 for displaying information 3*b*, 3*b'*, 3*b''*, and an optic light guide material 12 provided between the contact surface 10 and the three-dimensional display surface 11 (see also FIG. 2). The faceplate 9 is integrated into the display 7 so that an areal extension of the three-dimensional display surface 11 and/or an areal extension of the contact surface 10 is smaller than an areal extension of the display 7, and so that the contact surface 10 is arranged to receive light emitted from the display 7. The faceplate 9 is mounted to the display 7 so that the faceplate 9 covers a partial area of the display 7. The faceplate 9 and its arrangement are also shown in FIG. 2 and further explained with reference thereto.

Thus, the user interface 1 comprises the two-dimensional display 7 and the optical faceplate 9 to output the visibly perceivable information 3a, 3b, 3b', 3b''.

As shown in FIG. 1, the user interface 1 comprises a context determination device 13 adapted to determine a context 14 according to a state of the vehicle 15, the information 3a that is visible on the display portion 8, the information 3b, 3b', 3b'' that is visible on the three-dimensional display surface 11, and/or user input 5 captured by the user interface 1. Optionally, the context determination device 13 is a data processing device. For the determination of the context 14, the context determination device 13 comprises one or more interfaces to receive, and/or one or more data storages to store, data about the state of the vehicle 15, the information 3a that is visible on the display portion 8, the information 3b, 3b', 3b'' that is visible on three-dimensional display surface 11, and/or user input 5 captured by the user interface 1.

The user interface 1 is adapted to display contextually dependent information 3a, 3b, 3b', 3b'' so that the information 3a that is visible on the display portion 8 and the information 3b, 3b', 3b'' that is visible on the three-dimensional display surface 11 depend on the determined context 14. This allows the content of the user interface 1 to be intelligent and contextual such that the digital graphical content that is displayed on the display portion 7 and on the three-dimensional display surface 11, e.g., buttons, sliders, icons, texture, gradients, colors, etc. that are presented as information 3a, 3b, 3b', 3b'', can vary, adapt or respond according to the state of the vehicle 15, vehicle features, user selections and user interface interactions, e.g., user input 5. The state of the vehicle 15 can comprise the state of a smart device connectable to the vehicle 2, e.g., location, calendar, weather, phone calls, messages, email, music, movies, and state of the user(s), e.g., biometrics, brain waves, eye gaze, or stress, emotion, etc.

For example, when a door of the vehicle 2 is opened, the user interface 1 can display a welcome message to welcome the user 4. Or when specific features are activated and/or operated, such as communication, infotainment, navigation, climatization, a settings of a seat of the vehicle 2, etc., when music or movies are played, or when an intelligent personal assistant is engaged, the context determination device 13 can determine a context 14 corresponding to the activation and/or operation of one or more of said features or activities and can select an appropriate piece of information 3a, 3b, 3b', 3b'' that is to be displayed at the display portion 8 of the two-dimensional display 7 or at the three-dimensional display surface 11 of the faceplate 9. Several relationships are possible, e.g., a simple relationship such as door status implies welcome message, multiple relationships, e.g., door status and/or weather imply welcome message, or more sophisticated/complex relationships, AI/machine learning driven relationships, e.g., patterns to anticipate future patterns/behavior such as 8 am Monday morning implies drive to work, energizing mood, music, lighting, traffic, navigation route, etc. can imply a certain output of the user interface 1.

The user interface 1 comprises a memory 16 to store past data 17 relating to a context 14 that was determined in the past, a past state of the vehicle 15, a past information 3a that was visible on the display portion 8, a past information 3b, 3b', 3b'' that was visible on the three-dimensional display surface 11, and/or past user input captured 5 by the user interface 1. The context determination device 13 is adapted to receive said past data 17 and to determine the context 14 based on said past data 17. The memory 16 is coupled by an interface with the context determination device 13. The context determination device 13 is adapted to receive said past data 17 and to determine the context 14 based on said past data 17.

The display portion 8 and the three-dimensional display surface 11 form a combined user interface 1 to display information 3a, 3b, 3b', 3b'' and to capture user input 5 in a consistent and combined manner. The user input 5 and how the user interface 1 is adapted to capture the user input 5 is detailed with reference to FIG. 3.

The user interface 1 can comprise multisensory feedback delivered via the user interface 1 such as visual feedback as displayed on the two-dimensional display 7, the faceplate 9, other OLED/LCD displays, ambient lighting or projection, audio feedback such as sound effects or music, haptic or tactile feedback and/or olfactory feedback (not shown).

FIG. 2 shows a section of a schematic side view of the user interface 1 shown in FIG. 1.

FIG. 2 is described with regard to details of the user interface 1 of FIG. 1.

The faceplate 9 is integrated into the two-dimensional display 7. I.e., the two-dimensional display 7 comprises a contact portion 18 that contacts the contact surface 10 of the faceplate 9 to transmit light that is emitted by the two-dimensional display 7 at the contact portion 18 via the contact surface 10 and the light guide material 12 to the three-dimensional display surface 11 where the transmitted light contains the information 3b, 3b', 3b'' that is visible on the three-dimensional display surface 11.

The three-dimensional display surface 11 comprises a plurality of surface portions 11a, 11b that are separated from each other by an edge 19. The faceplate 9 can be shaped to provide a three-dimensional surface that the user may touch. For example, the three-dimensional display surface 11 may be faceted, e.g., like a jewel, as schematically shown in FIGS. 1 and 2 or have segmented or continuous concave, convex, and/or organic surface portions (not shown), and/or may have a symmetric or asymmetric shape.

As shown in FIG. 2, the plurality of edges 19 segments the three-dimensional display surface 11 in a plurality of surface portions 11a, 11b. The user interface 1 is adapted to display contextually dependent information 3b, 3b', 3b'' so that the information 3b', 3b'' that is visible on the plurality of surface portions 11a, 11b depend on the determined context 14 and to separately determine the information 3b', 3b'' that is visible on the plurality of surface portions 11a, 11b. I.e., each segment of the faceplate 9 can display different information 3b, 3b', 3b''.

In another embodiment (not shown), an edge or a section of the three-dimensional display surface 11 may be virtually simulated or enhanced by the graphical treatment of the GUI, e.g., digitally change the color/material/finish, material/surface rendering and/or lighting can change the appearance of the faceplate 9. For example, the faceplate 9 having a nominal or default physical form, wherein the appearance of the faceplate 9 changes according to the determined context 14.

The faceplate 9 is touch sensitive to capture user input 5 as a user interaction 5b relative to the faceplate 9.

The faceplate 9 can be made of glass or a polymer. The composition of the faceplate 9 and in particular its light guide material 12 is further detailed in FIGS. 6 and 7 and in the description thereof. As indicated schematically in particular in FIG. 2, the faceplate 9 is a solid body without any cavity to ensure an efficient transmission of light. The light that is transmitted from the contact portion 18 of the two-dimensional display 7 to the three-dimensional display surface 11 leaves the faceplate 9 directly at the boundary between the three-dimensional display surface 11 and a surrounding of the faceplate 9, e.g., air, typically the in the cabin 6 of the vehicle 2. I.e., the light that is transmitted from the contact portion 18 is transmitted through only the solid body of the faceplate 9 and has two pass two boundaries only, namely from the contact portion 18 to the contact surface 10 of the faceplate 9 and from the three-dimensional display surface 11 of the faceplate 9 to the surrounding. This reduces the number of boundaries that the light has to pass when travelling from the contact portion 18 to the user. Thereby, optical losses can be held at a low level and high-quality light-transmission is achieved.

FIG. 3 shows a schematic of a method to operate the user interface 1 as shown in FIGS. 1 and 2.

The user interface 1 receives user input 5 input by a user 4. The user input 5 can comprise touch user input 5a input by the user 4 via the display 7, user interaction 5b that is input relative to the faceplate 9, and remaining user input 5c, e.g., input that is received by physical buttons and/or other touch sensitive devices which are not comprised by the two-dimensional display 7 and the faceplate 9. I.e., optionally, remotely located input devices, e.g., MFL, seat controller, controller in the center console, etc. may also be used to provide user input 5 to the system. The user interface 1 also receives input about the state of the vehicle 15, e.g., the temperature exterior to the vehicle 2, the amount and/or identity of the passengers of the vehicle 2, the geographic position of the vehicle 2 etc. To capture touch input 5a, the two-dimensional display 7 is touch sensitive.

To capture user interaction 5b the faceplate 9 is touch sensitive and the user interface 1 is adapted to capture a gesture relative to the faceplate 9. The faceplate 9 is touch sensitive, e.g., by capacitive touch sensing and/or a force-touch sensing mechanism (pressure sensing). The touch sensitivity of the faceplate 9 can be combined with multi-modal sensors, e.g., head and/or eye tracking which can be camera based, finger and/or hand proximity and gesture sending for example by a camera such as based on RGB, IR, TOF imaging or LIDAR. Such interactions may include gestures based on touch, mid-air actions and/or mid-air gestures (i.e., gestures that are performed in a distance of 4 to 12 inches from the faceplate 9) and/or a proximity of the hand or finger to the faceplate 9. This can include a tab, slide, drag, long-press, force-touch, multi-touch etc. Such interaction may include multi-modal interactions e.g., where eye-gaze tracking is used to select GUI elements and a gesture is used to activate/action the selection. Or eye-gaze tracking is used to improve/enhance (e.g., stabilize) touch interaction. Camera based sensing can deliver information on presence, proximity and hover, e.g., non-touch inputs that provide pre-touch GUI input, e.g., display/GUI wakeup, GUI highlighting/effects, etc. Eye tracking can provide input or visual/graphical/optical effects, e.g., simulate dynamic parallax effects, rendering of color, material, finish, and texture effects.

The touch sensing may be shared across the faceplate 9 and the display 7 such that the combination of faceplate 9 and display 7 are effectively combined to an integrated user interface or interactive surface, in particular with different two-dimensional or three-dimensional surfaces or interaction zones. For example, the two-dimensional display may be the size of a wristwatch (approximately 35 mm to 50 mm), of a conventional CID or instrument cluster (with a diagonal of approximately 9 to 11 inches), or be much larger or a panorama display. The user interface 1 provides, by virtue of the faceplate 9, the benefits of physical affordance, such as a button, and the benefits of an interactive digital interface, such as a touch sensitive display, and combines said benefits.

The touch input 5a can influence the information 3a that is visible on the display portion 8, and the user interaction 5b can influence the information 3b that is visible on the three-dimensional display surface 11 of the faceplate 9. The state of the vehicle 15, the information 3a that is visible on the display portion 8, the information 3b, 3b', 3b" that is visible on the three-dimensional display surface 11, and user input 5, in particular the remaining user input 5c are transmitted to the context determination device 13. Also, the touch input 5a and the user interaction 5b can be transmitted to the context determination device 13 (not shown). Based on the transmitted data, the context determination device 13 determines the context 14.

In dependence on the determined context 14 the user interface 1 determines an output which is to be displayed at the display portion 8 of the two-dimensional display 7 and at the three-dimensional display surface 11 of the faceplate 9. Thereby, information 3a that is to be displayed at the display portion 8 is transmitted to the two-dimensional display 7 and information 3b that is to be displayed at the three-dimensional display surface 11 is transmitted to the faceplate 9.

For example, the context determination device 13 determines the context based on touch user interaction 5b and the information 3a that is visible on the display portion 8. This can be useful to effectively determine the content that is in particular to be displayed at the display portion 8. For example, the three-dimensional display surface 11 shows an icon that represents a radio functionality of the vehicle 2. The user 4 performs the user interaction 5b, e.g., by touching the three-dimensional display surface 11 where the radio functionality icon is displayed or by performing a corresponding gesture. If the display portion 8 already displays information 3a regarding the radio functionality of the vehicle 2 the user interface 1 determines that the content of the information that is visible at the display portion 8 does not change. However, if the display portion 8 displays for example information regarding the weather the user interface 1 determines that the content of the information 3a that is visible at the display portion 8 changes to detailed information regarding the radio functionality. I.e., in one embodiment, the context determination device 13 is adapted to determine a context 14 according to a state of the vehicle 15, the information 3a that is visible on the display portion 8, and/or the information 3b, 3b', 3b" that is visible on the three-dimensional display surface 11, and according to a user input 5 captured by the user interface 1. This enables a particular efficient determination of the output and improve the functionality of the user interface 1.

The user interface 1 may provide controls that are consistently available to the user 4, for example it could include home, menu, back buttons etc., navigation, context menus, shortcuts. The graphical user interface controls may dynamically shift or adapt according to the context 14 of the vehicle 2, the journey, a user profile, and or the user 4. GUI elements/content changes, and might be not consistent, depending on the context 14, e.g., when entering the vehicle 2, in case of an emergency situation, when specific functions are enabled, such as a vehicle setup, entertainment modes, etc.

The user interface 1 separately determines the information 3a that is visible on the display portion 8 and the information 3b, 3b', 3b" that is visible on the three-dimensional display surface 11. It is possible that the information 3a that is visible on the display portion 8 and the information 3b, 3b', 3b" that is visible on the three-dimensional display surface 11 relate to each other.

The user interface 1 is adapted to, depending on the determined context 14 and/or depending on the user input 5, move information 3a that is visible on the display portion 8 to the three-dimensional display surface 11 and/or to move the information 3b, 3b', 3b" that is visible on the three-dimensional display surface 11 to the display portion 8. Content may be dragged by the user 4 from one zone to the other, e.g., for customization, the user 4 may long-press or force-touch a user interface element in either zone and drag elements, icons, apps, and/or buttons, place and/or organize the layout, and/or enable or disable aspects of the user interface 1.

For example, a user 4 unlocks and/or opens a door of the vehicle 2. This forms a piece of information related to the state of the vehicle 15 and/or remaining user input 5c. The context determination device 13 determines a context 14 representative for unlocking, opening and/or entering the vehicle 2. A welcome information 3b, 3b', 3b" can be displayed at the three-dimensional display surface 11 while the information that is visible on the display portion 8 is void, i.e. the display portion 8 is deactivated. After the user 4 has taken place, which can be related to the state of the vehicle 15, the context determination device 13 determines a context 14 representative for the beginning of further interaction, e.g. driving the vehicle 2, and the welcome information 3b, 3b', 3b" on the three-dimensional display surface 11 could be replaced by some information which is relevant for driving the vehicle 2, e.g. the temperature in a surrounding of the vehicle 2, while the display portion 8 could be activated in order to present information 3a which the user 4 typically prefers to perceive when taking place in the vehicle 2, e.g. information relating to the radio or navigation. In addition to the state of the vehicle 15, optionally, a connected smartphone may deliver insights on the journey destination, e.g., calendar entry, navigation history/patterns, or navigation entry, etc.

The faceplate 9 becomes the iconic physical interaction hub that is context dependent; e.g., the GUI of the faceplate 9 may include: a home function, navigation features, e.g., with map on the display 7, music features, e.g., with album cover art or music video on the display 7, movie controls, e.g., with a movie showing on the display 7, climate control features, e.g., with advanced climate control features on the display 7 etc. Alternatively, what is shown or aspects of what is shown on the display 7 is driven by the context 14 of the vehicle 2 and is unrelated to the GUI on the faceplate 9, e.g., due to traffic info, navigation status/turn information, notifications, etc.

FIG. 4 shows a schematic representation of the user interface 1 and a user 4 looking at the user interface 1 of FIGS. 1 and 2.

The user 4 looks at a view angle 20 at the user interface 1. The user interface 1 is oriented so that the two-dimensional display 7 has a normal 21 perpendicular to the two-dimensional display 7. The arrangement of the two-dimensional display 7 and the normal 21 can for example be locally determined by the shape of a section of the interior of the vehicle 2 in which the two-dimensional display 7 is mounted.

The faceplate 9 is mounted onto the two-dimensional display 7 so that the three-dimensional display surface 11 also comprises a normal 2T locally perpendicular to the three-dimensional display surface 11 which locally coincides with the normal 21 of the two-dimensional display 7 (not shown in FIG. 4). As shown in FIG. 4, the faceplate 9 comprises a surface portion at which the normal 2T of the three-dimensional display surface 11 coincides with, i.e., is parallel to, the normal 21 of the two-dimensional display 7 and which is arranged in a central section of the three-dimensional display surface 11.

The three-dimensional display surface 11 defines a viewing cone 22. The viewing cone 22 is depicted in FIG. 4 as an angle and delimits the possible view angles 20 of the user 4, i.e., a user looking with a view angle 20 within the viewing cone 22 can perceive any information 3b, 3b', 3b" that is displayed at the three-dimensional display surface 11, and, optionally, the user 4 looking with a view angle 20 outside the viewing cone 22 cannot perceive information that is displayed at the three-dimensional display surface 11. FIG. 5 shows a schematic representation of two users 4 in a vehicle 2 looking at the user interface 1 of FIGS. 1, 2, and 4. The user interface 1 is mounted in the cabin 6 of the vehicle 2. The two-dimensional display 7 is curved to follow the shape of a section of the cabin 6. The faceplate 9 is mounted at the two-dimensional display 7. The faceplate 9 is placed centrally at the two-dimensional display 7 so that both users 4 have equal access. In a non-shown embodiment, the faceplate 9 can be arranged towards the driver. The application of the faceplate 9 to the two-dimensional display 7 may determine the orientation of the faceplate 9. In another embodiment (not shown), the user interface 1 and/or the faceplate 9 can be arranged elsewhere, e.g., in a different area of the vehicle 2, e.g., inside or outside, to deliver perceivable output for a driver and/or a passenger other than depicted, to provide a steering wheel multifunction controller (MFL), personal information display (PID), remote control, panorama display, other specific controllers, and/or to integrate separate controllers into a new single contextual controller, e.g., combining controllers for control of a seat, a window, a door, etc.

Schematically, two users 4 are shown. Each of the users 4 looks with an individual view angle 20 at the faceplate 9. The position of the user 4, e.g., a typical, nominal, and/or range of seat positions, and therefore the user's view angle 20 to the faceplate 9 and/or the two-dimensional display 7 may not necessarily be parallel to the optimal view angle defined by a distinguished direction 24 to the faceplate 9 (see also FIGS. 6 and 7), e.g., a center axis and/or a normal 2T perpendicular to the three-dimensional display surface 11. Additionally, the view angle 20 onto the faceplate 9 is dependent on the position of the faceplate 9 relative to the user 4, e.g., the further away from the user 4 the more of off-axis the view angle 20 onto the faceplate 9 will be. The view angle 20 of two or more users 4 can be improved by averaging the positions. The distinguished direction 24 of optimal view can be determined by evaluating an average hand and/or eye position, e.g., an eye box, relative to the position of the faceplate 9. The faceplate 9 is arranged so that the distinguished direction 24 is aligned with a typical view angle 20 optimized for the typical eye box, i.e., the range of eye locations, of users 4 and could optionally be configured to optimize the image quality transmitted from the two-dimensional display 7. Control of the distinguished direction 24 can provide a privacy feature, such that the digital content on the faceplate 9 or a surface portion 11*a*, 11*b* of the three-dimensional display surface 11 cannot be viewable from outside of a defined local viewing cone 22 relative to the faceplate 9, a surface portion 11*a*, 11*b* thereof, the two-dimensional display 7 or the cabin 2. Therein, the viewing cone 22 is defined by the size of the viewing cone 22, i.e., the opening angle, and/or the orientation of the viewing cone 22, i.e., its central axis, e.g., the distinguished direction 24. The privacy feature could limit interaction to specific users 4, e.g., driving controls are only to be accessible to the driver, whereas entertainment features are accessible to a nondriving passenger, e.g., to prevent driver distraction.

The user interface 1 is adapted to display the information 3*b*, 3*b'*, 3*b"* that is visible on the three-dimensional display surface 11 so that light emitted from the display 7 is projected onto the three-dimensional display surface 11 and/or manipulated according to the three-dimensional display surface 11. Optionally, the manipulation can comprise, digitally simulating different materials such as opaque or transparent materials, digitally changing the optical behavior, e.g., the appearance is caused by a simulation of different refractive indices of the material, such as glass or another material or substance, material and texture/finish, mapping the environment or alternate environment in the rendering of optical effects, e.g., environmental reflections, reflected color, shadows, parallax, etc. This can be further enhanced by tracking head/face/eye position. Some of these effects may also be dynamic, e.g., similar to the shimmer of reflections in/from a swimming pool.

Figures 6, 7:
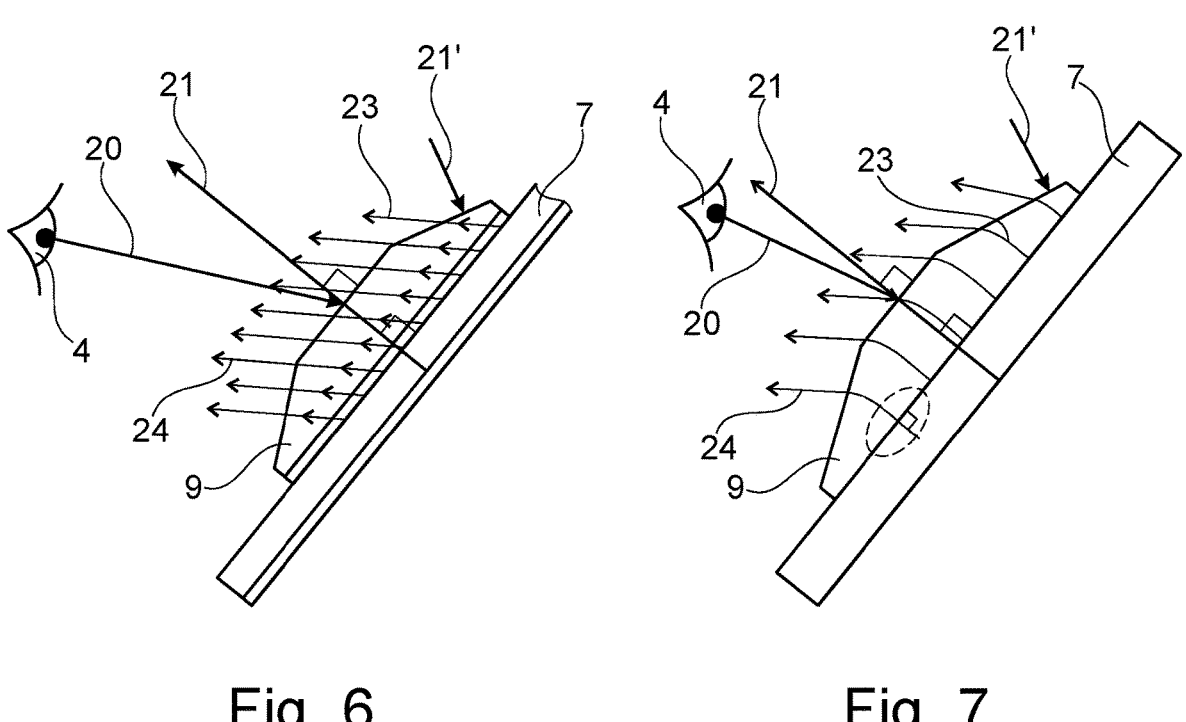
FIG. 6 shows an embodiment of a user interface with a view angle control of a faceplate having fiber optics configured in a first manner.
FIG. 7 shows an embodiment of the user interface with a view angle control of the faceplate having fiber optics configured in a second manner.

The faceplate 9 can provide a consistent, familiar and recognizable iconic central element of the user interface 1. Additionally, the faceplate 9 can provide a consistent location, home or iconic representation of an intelligent personal assistant (IPA), we are the IPA dynamically exists (e.g., lives, leaves and returns), and can be a physical interaction affordance to trigger, engage with, control, select and/or receive feedback from the IPA. FIGS. 6 and 7 show an embodiment of a user interface 1 with a view angle control of a faceplate 9, each.

The light guide material 12 of the faceplate 9 comprises fiber optics elements 23 having an axis each. The orientation of the fiber optics elements 23 or channels can be controlled in such a way that light can travel in a direction different from the normal 2T of the faceplate 9 or the normal 21 of the two-dimensional display 7. This enables an optimization of the view angle 20, e.g., horizontally and/or vertically, of the faceplate 9 according to the position of the user 4 and the position of the faceplate 9. The fiber optics elements 23 can be arranged so that the transmission of light and/or image information from the two-dimensional display 7 is optimal and ensures high image quality of the graphical user interface 1 or the digital content that is visible on the three-dimensional display surface 11 to the user 4.

Optionally, the light guide material 12 is a composition of many optical fibers (fiber optics elements 23 or similar light guiding material). The light guide material 12 is processed by being drawn and compressed (under heat and pressure) such that the resulting fiber optics elements 23 are on pitch spacing of between 5 and 50 microns or less. Thereby, the faceplate 9 becomes a solid body. The fiber optics elements 23 can be oriented (e.g., as a result of the material processing/formation or the fabrication of the final 3D Faceplate part) to control the viewing angle (i.e., viewing cone 22 with central axis longitudinal to the axis of the fiber optics element 23). The viewing angle of a 3D faceplate 9 is determined in whole by the viewing angle of the fiber optics elements 23 that make up the faceplate 9. The faceplate 9 can provide a high-quality transmission of light and a viewing cone 22 suited to the view angle 20 of the user 4 to be used with a high-resolution two-dimensional display 7, e.g., a two-dimensional display 7 with 4 k to 8 k resolution and/or a pixel density of 600 pixels per inch or more.

In FIG. 6, the fiber optics elements 23 are arranged so that each of the axes of the fiber optics elements enclose an angle of less than 90°, preferably less than 80°, with the three-dimensional display surface 11. In this embodiment, the fiber optics elements 23 are linear and parallel to each other, and parallel to the optimal view angle 20 defined by the distinguished direction 24.

In FIG. 7, between the contact surface 10 and the three-dimensional display surface 11, each of the fiber optics elements 23 is curved, i.e., curvilinear. The fiber optics elements 23 are arranged to be oriented perpendicular to the contact surface 10 as input, and the fiber optics elements 23 are curved to be oriented at three-dimensional display surface 11 in an angle different than 90°, preferably less than 80°, to the three-dimensional display surface 11 as output to be oriented to a position at which one of the users 4 typically expects to receive displayed information 3*b*, 3*b'*, 3*b"*. The light guide material 12 of the faceplate 9 comprises portions with differently oriented fiber optics elements 23. Thus, the faceplate 9 comprises different zones that are optimized for different viewing angles 20 or different user positions.

In any embodiment, the vehicle 2 can be a car. The vehicle 2 can be a partly or fully autonomously driving vehicle 2. The vehicle 2 can be a non-automotive vehicle, such as motorcycle or a bicycle. In case of a motorcycle, the user interface 1 can comprise a motorcycle handlebar controller or instrument cluster, e.g., a smaller controller on a touchscreen instrument or faceplate cluster that covers the entirety of the instrument cluster and optionally has a remote controller on the handlebars, with physical buttons or touch sensitive buttons.

LIST OF REFERENCE SIGNS 1 user interface
2 vehicle
3*a*, 3*b*, 3*b'*, 3*b"* information
4 user
5 user input
5*a* touch user input
5*b* user interaction
5*c* remaining user input
6 cabin
7 two-dimensional display
8 display portion
9 faceplate
10 contact surface
11 three-dimensional display surface 11*a*, 11*b* surface portion
12 light guide material
13 context determination device
14 context
15 state of the vehicle
16 memory
17 past data
18 contact portion
19 edge
20 view angle 21, 21' normal
22 viewing cone
23 fiber optics elements
24 distinguished direction

What is claimed is:

1. A user interface for a vehicle configured to present visible information and configured to capture user input, the user interface comprising:

a display comprising a two-dimensional display for displaying information on a display portion, and an optical faceplate comprising a contact surface, a three-dimensional display surface for displaying information, and an optic light guide material provided between the contact surface and the three-dimensional display surface; wherein the optical faceplate is integrated into the display such that at least one of an areal extension of the three-dimensional display surface and an areal extension of the contact surface is smaller than an areal extension of the display, and such that the contact surface is configured to receive light emitted from the display; wherein the user interface further comprises a context determination device configured to determine a context according to at least one of the group consisting of:

a state of the vehicle;

at least a portion of the information that is visible on the display portion;

the information that is visible on the three-dimensional display surface; and user input captured by the user interface; and wherein the user interface is configured to display contextually dependent information so that the information that is visible on the display portion and the information that is visible on the three-dimensional display surface depend on the determined context.

2. The user interface as claimed in claim 1, wherein:

the user interface is configured to separately determine the information that is visible on the display portion and the information that is visible on the three-dimensional display surface.

3. The user interface as claimed in claim 2, wherein:

the user interface is further configured to display the contextually dependent information so that the information that is visible on the display portion and the information that is visible on the three-dimensional display surface relate to each other.

4. The user interface as claimed in claim 1, wherein:

the user interface is further configured to, depending on the determined context, move at least one of the information that is visible on the three-dimensional display surface or the information that is visible on the display portion to the other of the three-dimensional display portion or the display portion.

5. The user interface as claimed in claim 1, wherein:

the user interface is further configured to, depending on the captured user input, move information that is visible on the display portion to the three-dimensional display surface.

6. The user interface as claimed in claim 1, wherein:

the user interface is further configured to, depending on the captured user input, move the information that is visible on the three-dimensional display surface to the display portion.

7. The user interface as claimed in claim 1, wherein:

the user interface comprises a memory configured to store past data consisting of at least one of the group consisting of past context data relating to a context that was determined in the past, a past state of the vehicle, past information that was visible on the display portion, past information that was visible on the three-dimensional display surface (11), and past user input captured by the user interface; and the context determination device is further configured to receive said past data and to determine the context based at least in part on said past data.

8. The user interface as claimed in claim 7; wherein:

the user interface is configured to separately determine the information that is visible on the display portion and the information that is visible on the three-dimensional display surface.

9. The user interface as claimed in claim 1, wherein:

the three-dimensional display surface comprises at least two surface portions that are separated by an edge; and the user interface is configured to display contextually dependent information so that the information that is visible on each of the at least two surface portions depends on the determined context.

10. The user interface as claimed in claim 1, wherein:

the three-dimensional display surface comprises at least two surface portions that are separated from each other by an edge; and wherein the user interface is configured to separately determine the information that is visible on each of the at least two surface portions.

11. The user interface as claimed in claim 1, wherein:

the faceplate is touch sensitive;

the three-dimensional display surface comprises at least two surface portions that are separated by an edge; and the user interface is configured to determine separate information to be displayed on each of the at least two surface portions.

12. The user interface as claimed in claim 1, wherein:

the user interface is configured to display the information that is visible on the three-dimensional display surface such that light emitted from the display is projected onto the three-dimensional display surface.

13. The user interface as claimed in claim 1, wherein:

the user interface is configured to display the information that is visible on the three-dimensional display surface such that light emitted from the display is manipulated according to the three-dimensional display surface.

14. The user interface as claimed in claim 1, wherein:

the display portion and the three-dimensional display surface form a combined user interface.

15. The user interface as claimed in claim 1, wherein:

the two-dimensional display is touch sensitive, the faceplate is touch sensitive, and the user interface is configured to capture a gesture relative to the faceplate as the user input.

16. The user interface as claimed in claim 1, wherein:

the optical light guide material of the faceplate comprises fiber optic elements, each fiber optic element having an axis; and the fiber optic elements are arranged such that each of the axes of the fiber optic elements are disposed at an angle of less than 80° with respect to the three-dimensional display surface.

17. The user interface as claimed in claim 1, wherein:

the optical light guide material of the faceplate comprises fiber optic elements, each fiber optic element having an axis; and the fiber optic elements are arranged such that each of the fiber optics elements is curved between the contact surface and the three-dimensional display surface.

18. The user interface as claimed in claim 17, wherein:

the light guide material of the faceplate comprises portions with differently oriented fiber optics elements.

19. A vehicle comprising the user interface as claimed in claim 1.

20. A method for operating a user interface for a vehicle that is configured to present visible information and configured to capture user input, the method comprising:

displaying information on a display portion of a display, the display comprising a two-dimensional display;

displaying information on a three-dimensional display surface of an optical faceplate via a contact surface arranged to receive light emitted from the display and, the optical faceplate including an optic light guide material provided between the contact surface and the three-dimensional display surface, wherein the faceplate is integrated into the display such that at least one of an areal extension of the three-dimensional display surface and an areal extension of the contact surface is smaller than an areal extension of the display;

determining a context according to at least one of the group consisting of a state of the vehicle, the information that is visible on the display portion, the information that is visible on the three-dimensional display surface, and user input captured by the user interface;

displaying contextually dependent information such that the information that is visible on the display portion and the information that is visible on the three-dimensional display surface depend on the determined context; and depending on the captured user input, moving the information that is visible on the three-dimensional display surface to the display portion and/or moving the information that is visible on the display portion to the three-dimensional display surface.

* * * * *